United States Patent
Basso et al.

(10) Patent No.: US 9,208,373 B2
(45) Date of Patent: *Dec. 8, 2015

(54) DIGITALLY-GENERATED LIGHTING FOR VIDEO CONFERENCING APPLICATIONS

(71) Applicant: AT&T Intellectual Property II, L.P., Atlanta, GA (US)

(72) Inventors: Andrea Basso, Ocean, NJ (US); Eric Cosatto, Highlands, NJ (US); David Crawford Gibbon, Lincroft, NJ (US); Hans Peter Graf, Lincroft, NJ (US); Shan Liu, Los Angeles, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 126 days.

This patent is subject to a terminal disclaimer.

(21) Appl. No.: 14/035,148

(22) Filed: Sep. 24, 2013

(65) Prior Publication Data

US 2014/0023237 A1 Jan. 23, 2014

Related U.S. Application Data

(63) Continuation of application No. 13/303,325, filed on Nov. 23, 2011, now Pat. No. 8,542,943, which is a continuation of application No. 12/877,644, filed on Sep. 8, 2010, now Pat. No. 8,086,066, which is a (Continued)

(51) Int. Cl.
*G06K 9/40* (2006.01)
*G06K 9/00* (2006.01)
*G06T 7/20* (2006.01)
*G06T 15/50* (2011.01)

(52) U.S. Cl.
CPC .......... *G06K 9/00281* (2013.01); *G06T 7/2033* (2013.01); *G06T 15/50* (2013.01); *G06T 2200/08* (2013.01); *G06T 2207/30201* (2013.01)

(58) Field of Classification Search
CPC ....................................................... G06T 15/50
USPC ............................................................ 382/274
See application file for complete search history.

(56) References Cited

U.S. PATENT DOCUMENTS

| | | | |
|---|---|---|---|
| 5,864,630 A | 1/1999 | Cosatto et al. |
| 5,987,154 A | 11/1999 | Gibbon et al. |
| 6,028,960 A | 2/2000 | Graf et al. |
| 6,040,841 A | 3/2000 | Cohen et al. |

(Continued)

OTHER PUBLICATIONS

Mukaigawa et al., "Photometric Image-Based Rendering for Virtual Lighting Image Synthesis", Summary of full paper presented at IWAR '99, Oct. 20-21, 1999, 4 pages.

(Continued)

*Primary Examiner* — John Strege

(57) ABSTRACT

A method of improving the lighting conditions of a real scene or video sequence. Digitally generated light is added to a scene for video conferencing over telecommunication networks. A virtual illumination equation takes into account light attenuation, lambertian and specular reflection. An image of an object is captured, a virtual light source illuminates the object within the image. In addition, the object can be the head of the user. The position of the head of the user is dynamically tracked so that an three-dimensional model is generated which is representative of the head of the user. Synthetic light is applied to a position on the model to form an illuminated model.

17 Claims, 10 Drawing Sheets

Related U.S. Application Data continuation of application No. 11/745,826, filed on May 8, 2007, now Pat. No. 7,805,017, which is a continuation of application No. 11/216,997, filed on Aug. 31, 2005, now Pat. No. 7,231,099, which is a continuation of application No. 10/057,063, filed on Jan. 25, 2002, now Pat. No. 6,980,697.

(60) Provisional application No. 60/265,842, filed on Feb. 1, 2001.

(56) References Cited

U.S. PATENT DOCUMENTS

| | | | |
|---|---|---|---|
| 6,072,903 A | | 6/2000 | Maki et al. |
| 6,118,887 A | | 9/2000 | Cosatto et al. |
| 6,288,721 B1 | | 9/2001 | Donoghue et al. |
| 6,342,887 B1 | | 1/2002 | Munroe |
| 6,363,160 B1 | * | 3/2002 | Bradski et al. ............ 382/103 |
| 6,530,662 B1 | | 3/2003 | Haseltine et al. |
| 6,667,741 B1 | | 12/2003 | Kataoka et al. |
| 6,741,756 B1 | * | 5/2004 | Toyama et al. ............ 382/291 |
| 6,980,697 B1 | * | 12/2005 | Basso et al. ............... 382/274 |
| 7,231,099 B1 | * | 6/2007 | Basso et al. ............... 382/274 |
| 7,805,017 B1 | * | 9/2010 | Basso et al. ............... 382/274 |
| 8,086,066 B2 | * | 12/2011 | Basso et al. ............... 382/274 |
| 8,542,943 B2 | * | 9/2013 | Basso et al. ............... 382/274 |

OTHER PUBLICATIONS

Loscos et al., "Interactive Virtual Relighting and Remodeling of Real Scenes", published Oct. 2000, pp. 1-21.

Yu et al., "Recovering Photometric Properties of Architectural Scenes From Photographs", published Jul. 1998, 12 pages.

Gershbein et al., "A Fast Relighting Engine for Interactive Cinematic Lighting Design", published Jul. 2000, 6 pages.

Faugeras et al., "3-D Reconstruction of Urban Scenes from Sequences of Images", published Jun. 1995, 24 pages.

Loscos et al., "Interactive Virtual Relighting of Real Scenes", Visualization and Computer Graphics, IEE Transactions on, vol. 6, Issue 4, Oct.-Dec. 2000, pp. 289-305.

Mukaigawa et al., "Photometric Image-Based Rendering for Virtual Lighting Image Synthesis", Augmented Reality, 1999, IWAR'99 Proceedings, $2^{nd}$ IEEE and ACM International Workshop on Oct. 20-21, 1999, pp. 115-124.

Basso et al., Virtual Light: Digitally-Generated Lighting for Video Conferencing Applications:, Image Processing, 2001, Proceedings, 2001 International Conference on vol. 2, Oct. 7-10, 2001, pp. 1085-1088.

* cited by examiner

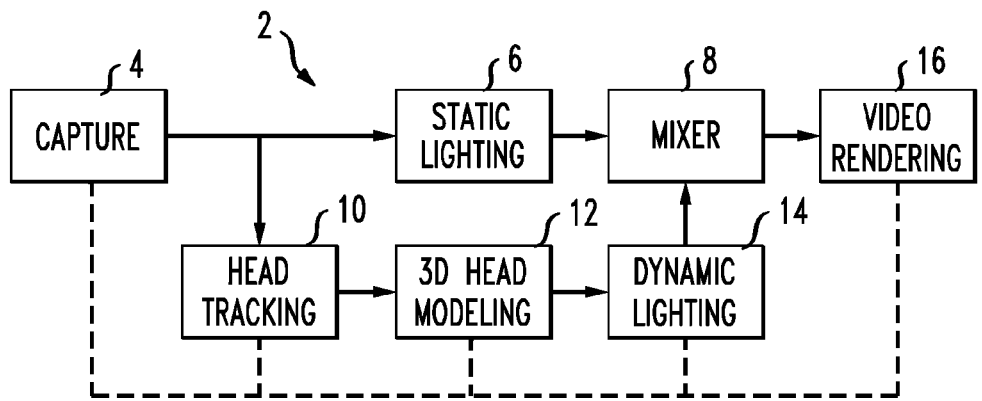
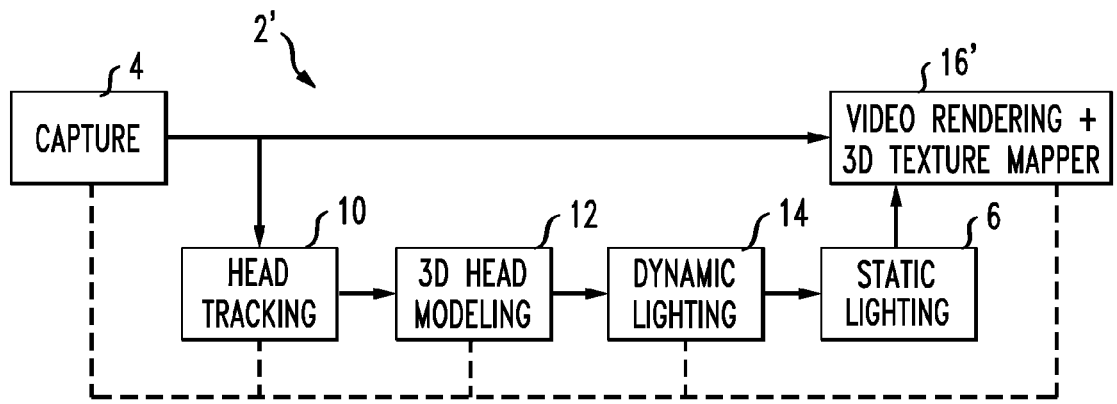

c1=0.3,c2=0.3,c3=.03
and 0dλ=0sλ=1 ka=0.7,kd=0.1,ks=0.3,m=1 ka=0.5,kd=0.3,ks=0.4,m=40 ka=0.6,kd=0.1,ks=0.2,m=6.

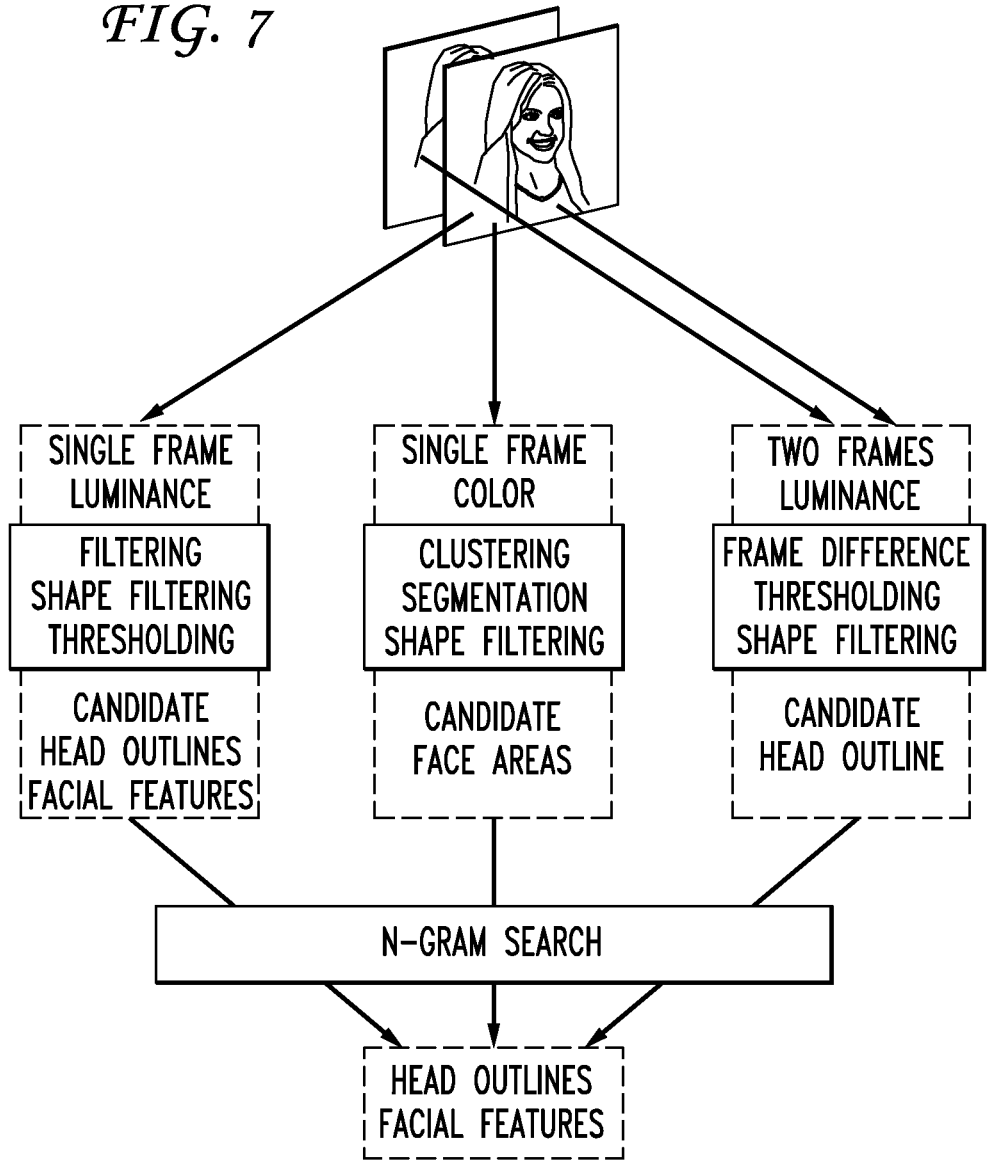

DIGITALLY-GENERATED LIGHTING FOR VIDEO CONFERENCING APPLICATIONS

CROSS-REFERENCE TO RELATED APPLICATIONS

The present application is a continuation of U.S. patent application Ser. No. 13/303,325, filed Nov. 23, 2011, which is a continuation of U.S. patent application Ser No. 12/877,644, filed Sep. 8, 2010, now U.S. Pat. No. 8,086,066, which is a continuation of U.S. patent application Ser. No. 11/745,826, filed May 8, 2007, now U.S. Pat. No. 7,805,017, which is a continuation application of U.S. patent application Ser. No. 11/216,997, filed Aug. 31, 2005, now U.S. Pat. No. 7,231,099, which is a continuation of U.S. patent application Ser. No. 10/057,063, filed on Jan. 25, 2002, now U.S. Pat. No. 6,980,697, which claims the benefit of U.S. Provisional Application Ser. No. 60/265,842, filed Feb. 1, 2001, all of which are incorporated herein by reference in their entirety.

FIELD OF THE INVENTION

The present invention generally relates to image processing, in particular to a system and method of digitally generating light for electronic video conferencing over telecommunication networks.

BACKGROUND OF THE INVENTION

In the last few years, the development of high quality multimedia and the availability of powerful computing platforms ability to handle video and audio in real-time has increased the interest in video and audio applications. Although, video coding and delivery schemes are available to the users, the quality of the picture is generally undesirable due to bad lighting conditions caused in part by the poor quality of available lighting apparatus. Conventional video conferencing apparatus have certain drawbacks regarding the transmitted picture quality. In particular, video conferencing apparatus very often transmits underexposed participants, which degrades the viewing experience and the quality of the conference. User-provided camera controls are generally insufficient for compensation of bad lighting conditions. In addition, it is undesirable to have numerous special lights at the physical conference location. These special lights may be uncomfortable to the participants due to additional heat given off by the lights. Other drawbacks include, the lack of sufficient electrical power to work the lights, and the inability to control the light parameters. Even if one was to try spot lighting the scene with physical lights, the trial-and-error process is highly inefficient and costly.

An approach to re-lighting has been developed as an extension of computer augmented reality (CAR). In such methods employing CAR, a set of static photographs taken in controlled light conditions or a video sequence are reconstructed three-dimensional geometrically. Several vision techniques are used for the scene reconstruction, such as camera calibration, mosaicing, computation of the epipolar geometry, which results in a polygonal reconstruction of the scene. Light exchanges among objects in the scene are computed and illumination textures coming from real and synthetic lights are modeled and reintroduced in the scene. While these CAR systems provide realistic effects of re-lighting, these CAR systems have certain drawbacks and undesirable features. These CAR systems are complex, non-real time based, and require entire geometrical reconstruction of the entire scheme being re-lighted. These CAR systems do not accommodate video conferencing applications, nor real-time applications. Also, the CAR systems do not dynamically adjust a light source illuminating an object in the scene when the object is moving in real-time. Thus, what is needed is a system and method for improving image and talking head sequences.

SUMMARY OF THE INVENTION

The present invention pertains to a system and a method to improve the lighting conditions of a real scene or a video sequence. In one aspect, digitally generated light is added to a scene for video conferencing over telecommunication networks. A virtual illumination equation is implemented that takes into account light attenuation, lambertian and specular reflection. In another aspect, the present invention modifies real light sources intensities and inserts virtual lights into a real scene viewed from a fixed viewpoint.

In a first aspect of the present invention, there is provided a computer-implemented method of the digitally illuminating an object in real-time. The method features capturing an image of an object, providing at least a virtual light source for illuminating the object within the image, extracting a surface position of the object, illuminating the object at least at the extracted surface position with the virtual light source, and displaying an illuminated object within the image. In further aspects of the present invention, a two-dimensional plane of the object is created in which the two-dimensional plane illuminated with the virtual light source. In another aspect, during illuminating of the object, a diffused light component and a specular lighting component are combined.

In a second aspect of the present invention, there is provided a method of selectively illuminating a head of a user for an image processing system in real-time. The method features capturing an image of the head of the user, determining the position of the head of the user to obtain position information; generating a model of the head of the user using the position information, applying a synthetic light to a position on the model to form an illuminated model, and combining the illuminated model and the image. In further aspects, the position of the head of the user is dynamically tracked so that an ellipsoid is generated which is representative of the head of the user. In this manner, at least video conferencing applications where typical lighting conditions (i.e. the average office or home environment) are poor can be greatly improved.

BRIEF DESCRIPTION OF THE DRAWINGS

For a better understanding of the present invention, reference is made to the following description of exemplary embodiments thereof, considered in conjunction with the accompanying drawings, in which like reference numbers refer to like elements, and wherein:

FIG. 1 is a schematic diagram of a first embodiment of an image processing system according to the teaching of the present invention;

FIG. 2 is a schematic diagram of a second embodiment of an image processing system according to the teaching of the present invention;

FIG. 7 is a schematic diagram of a method for facial feature tracking analysis;

DETAILED DESCRIPTION OF THE INVENTION

Figure 3:
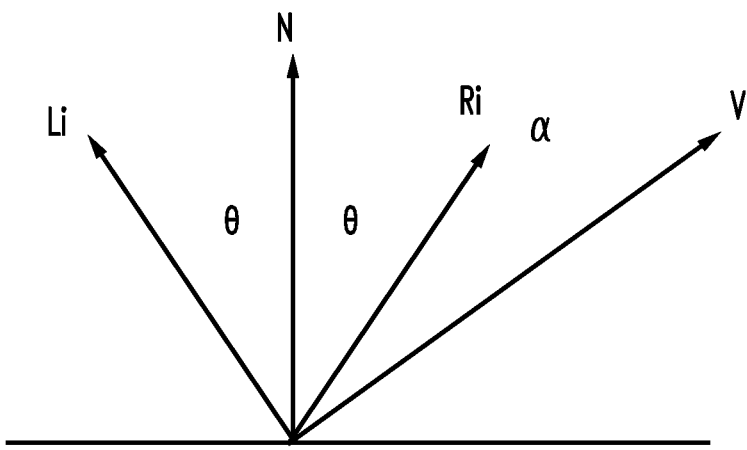
FIG. 3 is a schematic representation of a lighting model.

To assist the reader in the understanding of the invention and ease of explanation, the specification has been divided into the following sections: Illumination Models, Still Image Processing Application, and Video Conferencing Application.

An overview of a first embodiment of a video processing system 2 is illustrated schematically in FIG. 1. The first embodiment is used in a pixel based approach. In this approach the system 2 operates directly on the pixels of an input image that is processed. Nevertheless, one of ordinary skill in the art should recognize that at least the pixel color values in the area of interest can be varied to create the lighting effect. The pixel color values include red, green, and blue values, which are conventional components of a RGB signal. Other signals may be used to vary brightness and contrast of the image. A second embodiment of a video processing system 2' is illustrated in FIG. 2. The second embodiment is used with a conventional 3D texture mapper 16'. Texture mapped lighting is applied to the original input image or video. This can improve the visual quality of the illuminated image. Texture mapping is a technique commonly used in electronic video games in a simulated environment.

Nevertheless, both embodiments of the video processing system 2, 2' operate to improve image quality. In general, video processing system 2 and 2' operate by employing a virtual illumination equation that takes into account light attenuation, lambertian and specular reflection. This equation is used in an example embodiment to model a 3D space in which an image or video frame lies on a 2D plane. Virtual lights are placed in the 3D space and illuminate the 2D image. In an alternative embodiment for talking head video sequences, the head of a subject is modeled as a three-dimensional object, such as an ellipsoid. Then virtual lights are used to illuminate the head of a person in front of a camera (shown in FIG. 12).

Video processing system 2 includes several software or program procedural components that execute programmed instructions for specific predetermined purposes. The program procedural components includes some or all of the following modules—an image capture module 4, a static lighting module 6, a mixing module 8, a tracking module 10, a modeling module 12, a dynamic lighting module 14, and a video rendering module 16. Referring to FIG. 2, video processing system 2' also includes image capture module 4, static lighting module 6, tracking module 10, modeling module 12, dynamic lighting module 14, and texture mapper 16' includes a rendering portion. Each module will be described in detail herein.

A brief overview of the function of each module is described below. Image capture module 4 receives video scene data from a camera or any suitable digital video camera for processing on the system. Static lighting module 6 receives the video scene data and inserts synthetic or virtual lighting into the video scene data. Mixing module 8 receives data from the static lighting module and dynamic lighting module 14 so as to digitally combine virtual lighting and real lighting for realistic lighting enhancement.

Tracking module 10 provides position information when the heads of persons seated in front of a video conferencing camera moves. Modeling module 12 creates a three-dimensional model of the head of person seated in front of the camera so as to form an ellipsoid model. Dynamic lighting module 16 receives position information and moves the lighting to correspond to the movement of the head being tracked. Video rendering module 16 displays the processed video data from the mixer module 8. It should be understood that the processed video data can be also transmitted to a destination video conferencing device (see FIG. 12).

Shown schematically in FIG. 1, video processing system 2, 2' may operate in a computing environment of a conventional general-purpose computer, including but not limited to a mini-computer, a high-speed computer workstation, a personal computer, or a laptop computer. Hardware components of system 2 may include a central processing unit (not shown), a system memory (not shown), and a system bus (not shown) that couples various computer system components. The central processing unit may be one or more suitable general-purpose microprocessors used in a conventional computer. The system may use any number of conventional operating systems, such as MICROSOFT WINDOWS®, WINDOWS NT®, WINDOWS XP®, UNIX®, or LINUX® or other variations.

Referring to FIG. 1, mixing module 8 receives data from the static lighting module 6 and dynamic lighting module 14 so as to digitally combine virtual lighting and real lighting for realistic lighting enhancement. The mixing module employs standard conventional numerical smoothing algorithms for clipping and color saturation control as known in image processing. As one can appreciated any number of methods can be implemented for mixing the virtual lighting and real lighting for display.

Further into the details of the inventive image processing system, static lighting module 6 and dynamic lighting module 14 implement a virtual illumination algorithm which may take into account light attenuation, lambertian and specular reflection for enhancing the image as described in the Illumination model section below.

Illumination Model

The most relevant factors that account for change in appearance on an object due to a variation in lighting conditions is reflection and shadow. Reflection can be classified having a diffuse component, which is typical of non-shiny surfaces, and a specular component, which is typical of shiny surfaces. Objects illuminated solely by diffusely reflected light exhibit an equal light intensity from all viewing directions. While specular reflection instead, depends on the viewing direction and is at a maximum value along the reflection direction. A bright highlight called a specular highlight appears from viewing directions near to the reflection direction.

Shadows can be classified as a self-shadow, which is dependent on the surface normal vector and the lighting direction. Self-shadow appears where an object surface does not see the lighting direction. Otherwise, a shadow can be a cast-shadow that depends from the overall illumination and it is observed where other objects occlude the light. So for a given point on an image a simplified illumination model can be represented as $I=I_a+I_d+I_s$ for regions of non-occluded light and $I=I_a$ for regions with occluded light, where $I_a$ accounts for the intensity of a diffused, non-directional light source called ambient light, $I_d$ accounts for diffused reflection contribution of the surface at that given point and $I_s$ refers to the specular reflection component. Such a light model has been extensively studied and it is commonly known as the Phong model. In addition, the light model can also be expressed by $I=I_a+I_d$ and is known as Lambertian reflection model. It is possible to show that for a given point on a surface, the illumination provided by i distinct lights is given by the following general illumination equation:

$$I_\lambda = I_a k_a O_{d\lambda} + \Sigma^n_i I_{p\lambda,i}[k_d O_{d\lambda}(N \cdot L_i)) + K_s O_{s\lambda}(R_i \cdot V)^{m_i}] \qquad (1)$$

The terms in the general illumination equation are defined as follows: Ia is the intensity of ambient light, ka is the ambient-reflection coefficient, Odλ and Osλ are the diffuse and specular color of the surface of an object being illuminated. The term N is the surface normal vector at the point of illumination and Li is a normalized vector indicating the direction to the ith light source (see FIG. 3). The term $I_{p\lambda,i}$ is the intensity of the ith light source, and kd is the diffuse coefficient or the level of diffuse reflection of that point on the surface. The exponent mi is called the specular reflection exponent. It determines the speed at which the specular reflection diminishes as the viewing direction moves away from the direction of reflection. In other words, it defines the size of the specular highlight. When the value of mi is small, the size of the specular highlight is large; as mi increases, the size of the specular highlight shrinks. Moreover, values of mi between 0 and 1 reduce the amount of specular reflection. The specular reflection coefficient ks controls the overall brightness of the specular highlight, independent of the brightness of the light sources and the direction of viewing. The vector R is the direction of reflection and V is the direction of viewing as shown in FIG. 3.

Equation 1 does not take into account light attenuation. In practice, a formula that works well is shown below in Equation 2:

$$A_i = \min\left(\frac{1}{c_1 + c_2 d_s + c_3 d_{s^2}}, 1\right) \qquad (2)$$

The terms of equation 2 are defined as follows: Ai represents the attenuation factor for the source light, c1 is a user defined constant that keeps the denominator from becoming too small when the light is close, c2 and c3 are specific to a light source model. The term ds represents the euclidean distance of the light source from a surface point. Therefore, in summary, in the case of n light source the virtual illumination equation implemented in an embodiment of the present invention can be expressed or defined as:

$$I\lambda = I_a k_a O_d \lambda + \Sigma^n_i A_i I_p \lambda_i [k_d O_d \lambda (N \cdot L_i) + K_s O_s \lambda (R_i \cdot V)^{m_i}] \qquad (3)$$

It should be recognized equation 3 may be used for a single light source as well (n=1). Nevertheless, light sources can be generally classified as a) non directional ambient light that contributes with constant intensity equally to every point in a scene; b) directional light that can be considered as a light source with a given direction that is not subject to any attenuation. In other words the source is infinitely far away from the surfaces it is illuminating; and c) point light sources.

Figure 4:
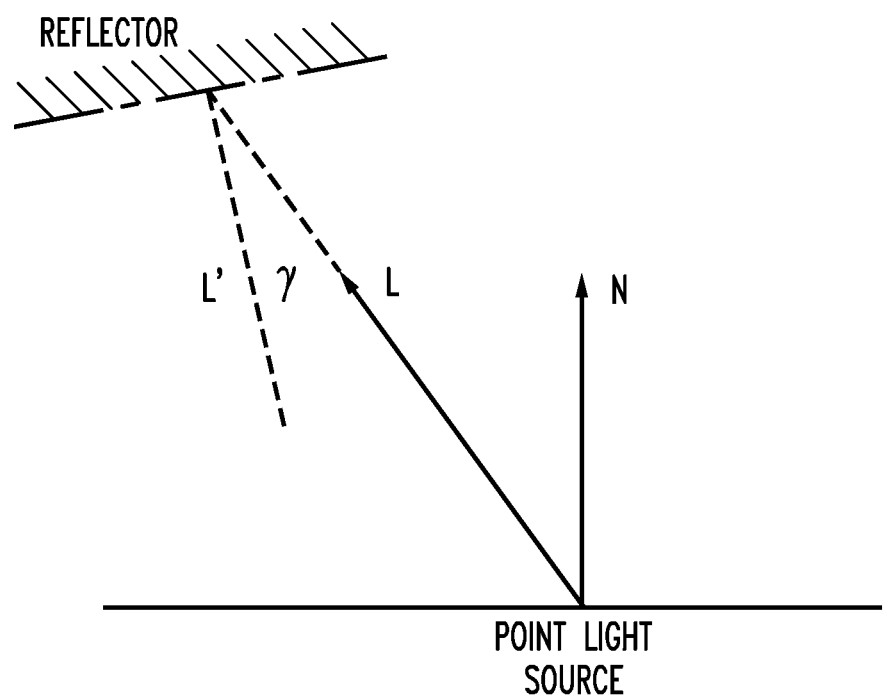
FIG. 4 is a schematic representation of a point light model.

An ideal point light source emits light uniformly and radially. The illumination that a point light source contributes to any point on a given surface depends on several factors, including source intensity and color, surface orientation and the distance from the point light source. A simple model for a more realistic non-equally radiating point source is commonly known as a Warn model. The model represents some of the directionality of the light typically used in photographic studios. Referring to FIG. 4, in the Warn model, a point light source with direction L is modeled by a point on a hypothetical specular reflecting surface. The light intensity at a given point on the surface depends from angle y between L and L'. Assuming that the reflecting surface has a specular coefficient of 1 then the light intensity at a point on the object is given by the following equation:

$$I_p \lambda_i = I_L \cos^p(\gamma) \qquad (4)$$

where $I_L$ is the intensity of the hypothetical light source;
p is the reflector's specular exponent; and
γ is the angle between L and L'.

It should be recognized that the larger the value of p, the more the light is concentrated along L'. This model is used to establish virtual light for different types of spot lights.

Still Image Processing Application

Referring to FIGS. 5A-5D, a first exemplary model consists of the scene placed on a 2D plane and virtual lights that are placed in the 3D space and illuminate the scene. Note that a given light can be placed on the image (i.e. z=0). In the exemplary model for static lighting, by way of example, looks loosely similar to the situation in which a photograph hanging on a wall is illuminated with spotlights and diffusers as it happens in museums and art exhibitions. For ease of explanation, this model will be referred to as the "museum model".

Figure 5A:
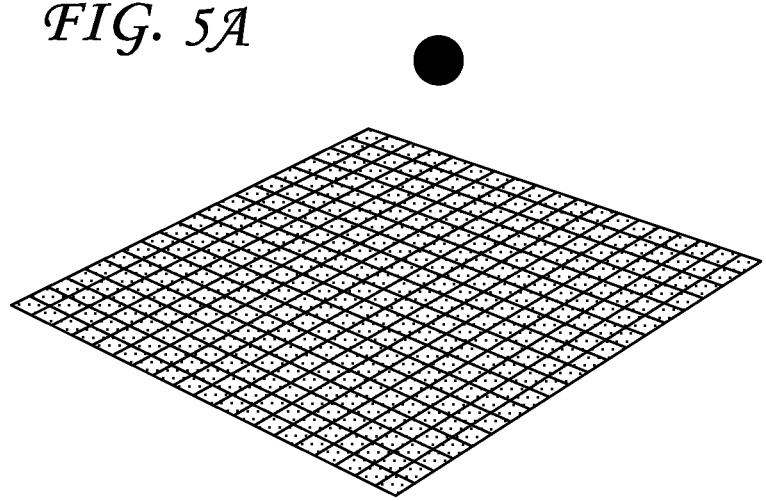
FIGS. 5A-5D are example three-dimensional diagrams of a museum lighting model.
Figure 5B:
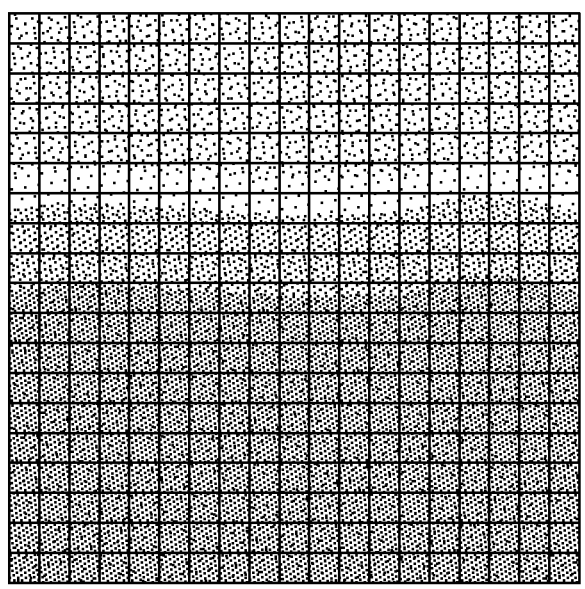
Figure 5C:
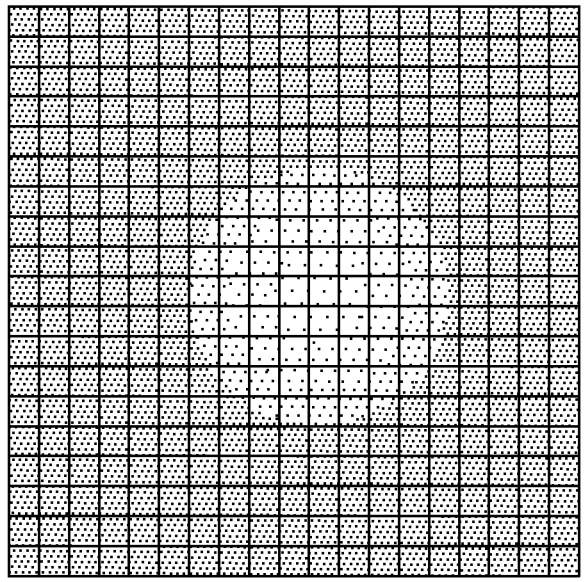
Figure 5D:
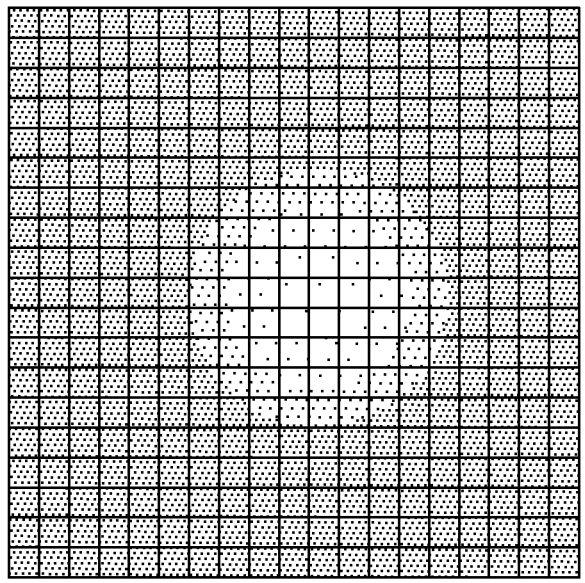

The museum model includes several advantages for implementation over conventional image processing: First, the model is computationally efficient which reduces computational overhead by using image properties such as brightness and contrast and not requiring a detailed scene analysis as in conventional CAR system. Second, a large variety of lighting scenarios and image effects can be generated with the museum model. Purely by way of example without limitation of the present invention, FIG. 5A shows a 3D space (a cube of 19×19×19 units) with a point light source placed in (12,12,10) represented by the dark sphere. FIGS. 5B, 5C, and 5D illustrate cases of light patterns that the model can generate. Regarding the virtual lighting equation (3), the attenuation parameters of are c1=0.3, c2=0.3, c3=0.3, and Odλ=Osλ=1. Of course, the specific parameters can be adjusted accordingly by one of ordinary skill in the art.

Advantageously, by placing directional light sources, such as direct and indirect point lights, it is possible to generate complex illumination effects on the 2D plane on which the image lies and selectively improve the perceived quality of the image or video sequence of images. It should be appreciated that the term Ka of Equation 3 represents the contribution to the image brightness. It is possible to estimate Ka from the evaluation of the input picture brightness. Ka can compensate if the input picture has a low brightness value. For every point light placed in the scene the corresponding Ks controls the brightness of the specular highlight. Together with the associated specular coefficient and the light direction can be used to highlight the region of interest of a video (for example, as shown in FIGS. 6B-6F below). The term Kd accounts for the diffuse reflection of the surface and has a more general use.

Figure 6A:
FIGS. 6A-6F are example pictorial representations of illuminated images with a museum model.
Figure 6B:
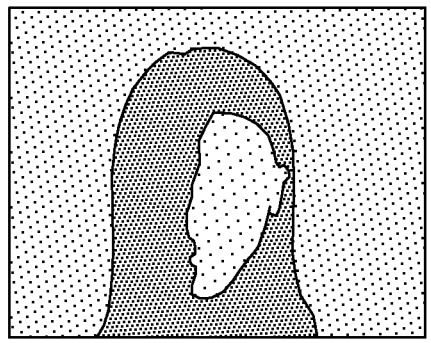
Figure 6C:
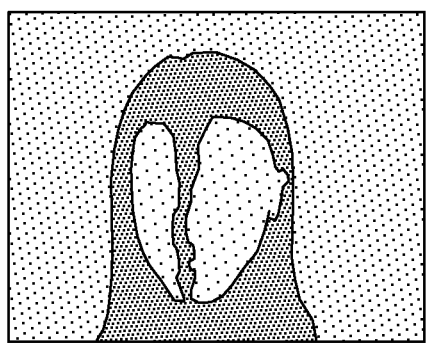
Figure 6D:
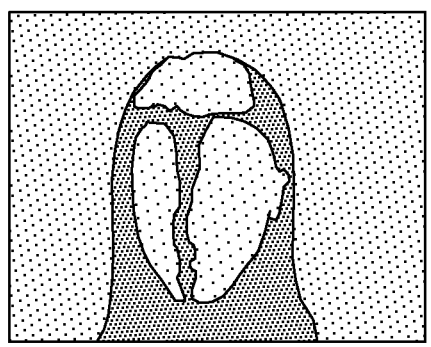
Figure 6E:
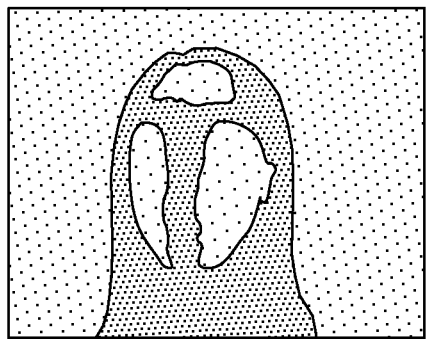
Figure 6F:

Purely by way of example without limitation of the invention, image processing results based on the museum model and an original image are illustrated in FIGS. 6A-6F. Accordingly, FIG. 6A represents an original image unprocessed image. Note that the image the face of the subject is generally underexposed. FIG. 6B illustrates a single point light applied to the image with parameters, such as ka=0.1, kd=0.1, ks=0.2, n=20. FIG. 6C shows the results of using two point lights with parameters, such as ka=0.2, kd1=kd2=0.1 ks1=ks2=0.2 n1=n2=2. FIG. 6D illustrates the results after three point lights are located at the top of the head and two sides. In addition, a point light is included that instead of being summed to the image brightness is subtracted. The subtraction from the image brightness is a way to generate shadows. FIG. 6F also has the same three point lights, as in FIG. 6D. Finally for comparison purposes, FIG. 6E represents the original image after processing of brightness and contrast but no addition of virtual lighting as in FIGS. 6B-6D.

Video Conferencing Application

Figure 9:
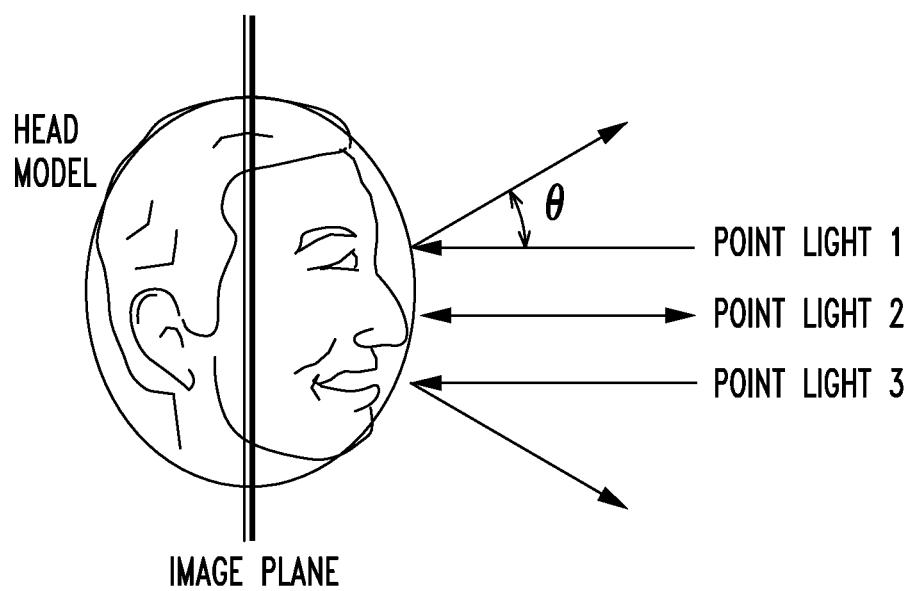
FIG. 9 is a schematic diagram of three-dimensional head tracking model.

The museum model embodiment can be extended for talking head sequences, such as video conferencing applications. In general, the present invention applies algorithms that enable real-time head detection and tracking. The output of the algorithms provides the head position in several forms, including a rectangle or an ellipse. Preferably, the ellipse information is used in the present invention to generate a three-dimensional ellipsoid as shown in FIG. 9. This three-dimensional ellipsoid is used to apply virtual lighting to the talking head. The present invention is not limited to an ellipsoid, but other complex shapes of the head can be obtained and used to generate refined lighting effects.

Referring to FIGS. 1 and 2, tracking module 10 provides position information when the heads of persons seated in front of a video conferencing camera moves. The tracking module 10 may be implement in a number of algorithms. In general, the outline of the head is detected to provide location for applying the virtual light. One approach to finding the outline of the head is disclosed in U.S. Pat. No. 5,987,154 to Gibbon et al., which is herein incorporated by reference. In the approach, in a series of video images, the head of a user is identified by digitizing sequential images to determine moving objects, calculating boundary curvature extremes of regions in the subtracted image, and comparing the extremes with a stored model of a human head. Therefore, the tracking module 10 is enabled to determine the location of the head in a dynamic manner. In the approach, the outline of the head is generally an ellipse shape on the image plane of interest.

Figure 8A:
FIGS. 8A and 8B are schematic diagrams illustrating head and facial feature tracking on a subject.
Figure 8B:
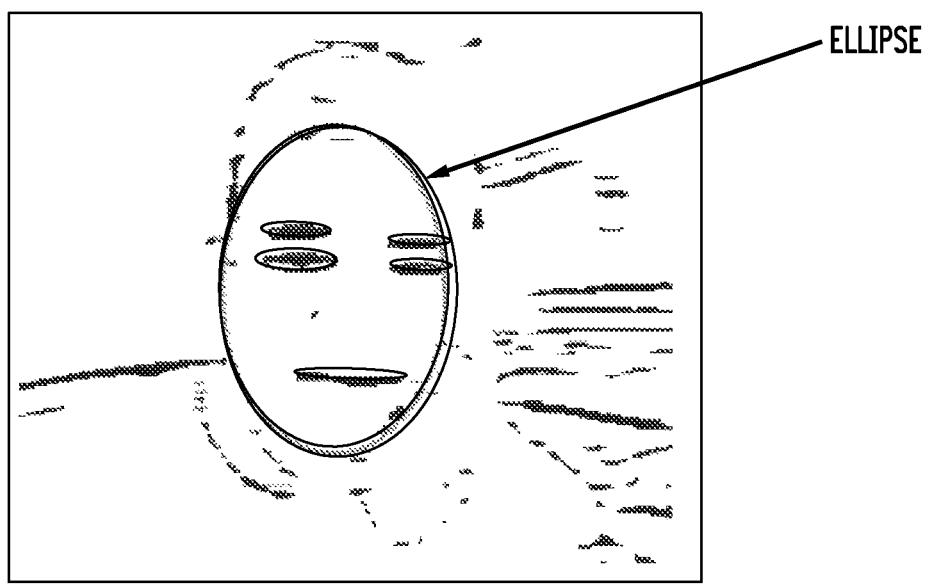

Once the outline of the head is determined, the facial features of the head are preferably tracked to refine a three-dimension model for applying the virtual lighting. FIGS. 8A and 8B schematically show the outline of the head of a user with various facial features for tracking. The facial features generally include the subject's mouth, eyes, eyebrows, or nostrils. There are a number of approaches to finding the facial features in the outline of the head. FIG. 7 illustrates a schematic diagram of the face analysis algorithm used to identify the locations of the facial features of a person in front of a video camera. The face analysis algorithm is disclosed in U.S. Pat. No. 6,118,887 to Cosatto et al., which is herein fully incorporated by reference. In sum, the facial features are recognized by a multi-modal approach, combining the result of color segmentation and shape analysis. If desired, the outline of the head could be determined in the color and shape analysis approach as well. Nevertheless, two or more facial features are used to obtain the head pose of the subject in front of the camera. In this approach, if the user is looking to the side, the lighting is different than when the user is looks straight into the camera. This approach provides information of whether the head is titled forward or backward, or even looking side-to-side. The head pose preferably provides the system with additional position information for applying the virtual lighting.

Referring to FIGS. 1 and 2, modeling module 12 preferably creates a three-dimensional model of the head of a person or a portion of a head of the person seated in front of the camera (not shown). Preferably, the three-dimensional model is in the form of an ellipsoid model. It is to be understood that the present invention is not limited to a three-dimensional ellipsoid. It is contemplated that more complex shapes can be modeled for the head of the user. This complex shapes can form a refined surface model. For example, a three-dimensional model of the head can be constructed to closely match the surfaces and features of the face. This refined surface model can be advantageous for improved shadow effects and point illumination of the head.

Nevertheless, position data or position information from the tracking module 10 is passed into the modeling module 12. Preferably, the ellipse information is used to generate a three-dimensional ellipsoid for creating a 3D head model as shown in FIG. 9. As shown in FIG. 9, point lights (1-3) are directed to the ellipsoid and reflections are created. Of course, the number of point lights can be adjusted as desired. For positioning the ellipsoid properly the head pose is obtained from the facial features, at least approximately. The facial features are marked on the ellipsoid and given the position of the features, the ellipsoid is then oriented so that the marked features match the ones observed in the image. The specific independent facial features provides the algorithm with at least two to three features to determine the appropriate orientation of the ellipsoid in which to apply the virtual lighting.

With further reference to FIGS. 1 and 2, dynamic lighting module 14 receives position information and moves the lighting to correspond to the movement of the head being tracked. In this module, the surface information of the ellipsoid is extracted so that the virtual lighting equation can be applied. The point light sources are in predetermined positions with respect to the ellipsoid and the lighting is mapped accordingly. If desired, predetermined surface properties can be added to the ellipsoid to create reflections, such as a shiny surface, or non-shiny. This can provide for a more realistic illuminated image to improve the perceived quality of the video sequence.

Figure 10A:
FIG. 10A-10C are example pictorial representations of illuminated images with a museum model and three-dimensional head model.
Figure 10B:
Figure 10C:

Purely by way of example without limitation of the invention, the results of the processing of the talking head sequence are shown in FIGS. 10A-10C. FIG. 10A is an original image unprocessed without applied virtual lighting. In FIG. 10B, a clear improvement appears from where the illumination model has been applied without 3D information. FIG. 10C shows even greater improvement where the ellipsoidal model has been used. The lighting in FIG. 10C appears more natural on the face of the subject in front of the camera.

Figure 11:
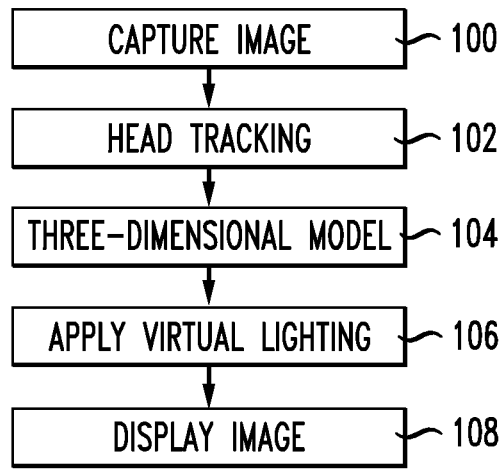
FIG. 11 is a generalized flow diagram of a method of digitally illuminating an object.

FIG. 11 illustrates a flow diagram of a method of digitally illuminating an object, such as a head of a person. In step 100, a camera captures the image. In step 102, the head motion of the subject in front of the camera is tracked in tracking module 10. This process produces position information of the head and facial features. In step 104, a three-dimensional ellipsoid is generated from the position information of the tracking module 10. In step 106, virtual lighting is applied to the ellipsoid and mixed together. In step 108, the image is displayed on the screen or transmitted to another device for viewing the image.

Figure 12:
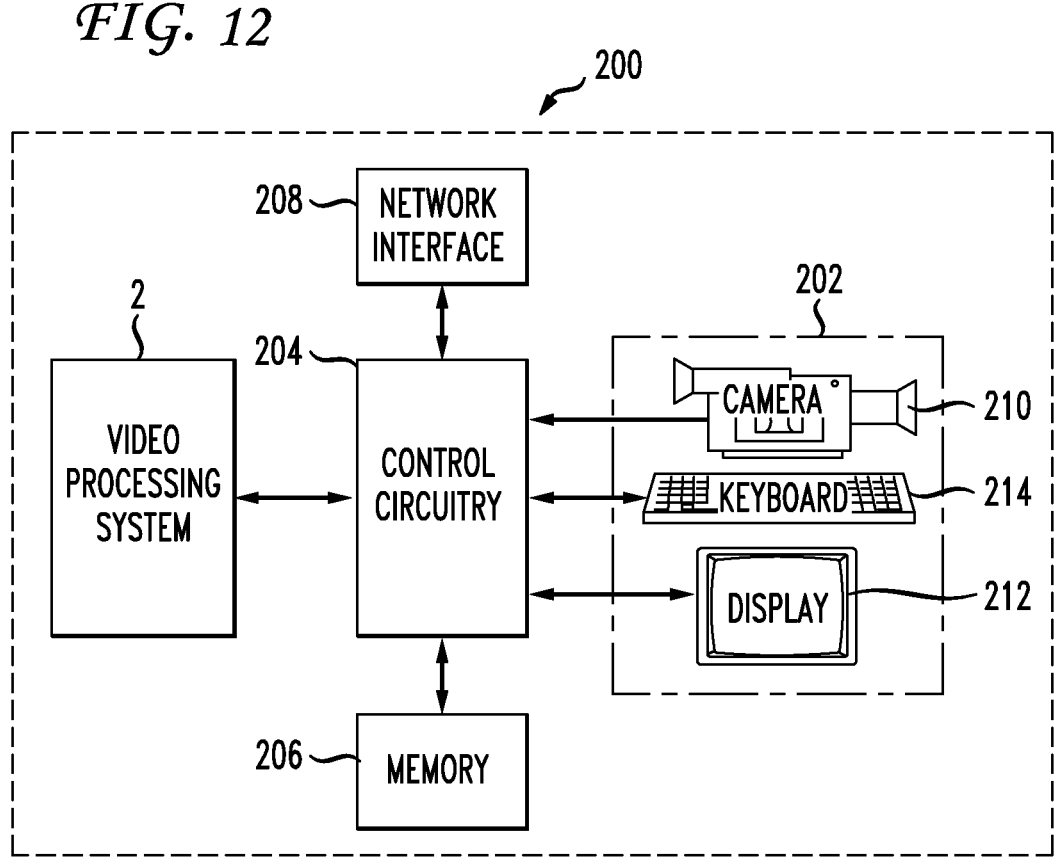
FIG. 12 is a schematic diagram of an example of a video conferencing system for the method of the present invention.

FIG. 12 is a schematic diagram of a video conferencing system 200 for implementing the video processing system of the present invention. Video conferencing system 200 may include several electronic and software components including a user interface 202, a control circuitry 204, a memory 206, a network interface 208, and video processing system 2 or 2'. Each component will be described in detail herein.

Referring to FIG. 12, user interface 202 is a component of video conferencing system 200, which sends out-bound video signals and receives in-bound video signals relating to the user of the system. User interface 202 is operatively connected to the control circuitry 204 and includes at least a video camera 210, and a display device 212. Display device 212 provides visual signals to the user in the form of alphanumeric characters, colors, graphics, and video movements. Display device 212 may be a known display device, such as a liquid crystal display, or computer monitor. The display surface of the device 212 may include one or more video windows for viewing the other party to the video conference. Video camera 210 may be any number of suitable video cameras for digital use, such as commercially available webcameras. If desired, a keyboard 214 may be included with user interface 202. With continued reference to FIG. 12, control circuitry 204 may include hardware and software that enables operation across a network (not shown). The control circuitry 204 may include a microprocessor for use on digital networks. In one arrangement, the video conferencing system may operate with commercially available operating software. Control circuitry 204 also includes an operable connection to memory 206. Memory 206 stores computer readable data installed or programmed by a user, including instructions for digitally illuminating an object. Memory 206 can be any type, which provides nonvolatile storage that can be electrically erased and/or reprogrammed.

Some suitable video conferencing systems can include a personal computer configured with a digital video camera or a videophone. It should be recognized that the video conferencing system may be configured with a standardized family of telecommunication protocols, such as H.323 standard used for real-time multimedia communications on packet-based networks having an Internet Protocol (IP). Nevertheless, other appropriate protocols may be used to facilitate connectivity between the video conferencing systems.

While the present invention has been described with reference to preferred and exemplary embodiments, it will be understood by those of ordinary skill in the art that various changes may be made and equivalents may be substituted for elements thereof without departing from the scope of the invention. In addition, many modifications may be made to adapt a particular situation to the teachings of the invention without departing from the scope thereof Different hardware may be used than shown and suggested that may comprise hardware, firmware, or software implementations of the present invention. Therefore, it is intended that the invention not be limited to the particular embodiments disclosed, but that the invention include all embodiments falling within the scope of the appended claims.

What is claimed is:

1. A method comprising:
    detecting, via a processor, a head within an image;
    determining an orientation of the head according to locations of at least two features on the head;
    establishing a position of a virtual light source in the image according to the orientation of the head; and
    modifying the image to have an illumination of the head using the virtual light source, wherein the illumination is further according to a distance of the head from the virtual light source.

2. The method of claim 1, the method further comprising communicating the illumination of the head to a video conference system.

3. The method of claim 1, wherein the at least two features on the head are two of an eye, a lip, an ear, a nose, a cheek, a chin, and an eyebrow.

4. The method of claim 1, further comprising tracking movement of the head, wherein establishing the position of the virtual light source comprises establishing the position according to the movement of the head.

5. The method of claim 4, wherein tracking the movement of the head yields a position information, the method further comprising creating a three-dimensional model of the head according to the position information.

6. The method of claim 1, wherein the illumination of the head is by a virtual diffused light.

7. The method of claim 1, wherein the illumination of the head illuminates a first portion of the head while not illuminating a second portion of the head.

8. A system comprising:
    a processor; and
    a computer-readable storage medium having instructions stored which, when executed by the processor, cause the processor to perform operations comprising:
        detecting a head within an image;
        determining an orientation of the head according to locations of at least two features on the head;
        establishing a position of a virtual light source in the image according to the orientation of the head; and
        modifying the image to have an illumination of the head using the virtual light source, wherein the illumination is further according to a distance of the head from the virtual light source.

9. The system of claim 8, wherein the computer-readable storage medium has additional instructions stored which, when executed by the processor, result in the operations further comprising communicating the illumination of the head to a video conference system.

10. The system of claim 8, the at least two features on the head are two of an eye, a lip, an ear, a nose, a cheek, a chin, and an eyebrow.

11. The system of claim 8, wherein the computer-readable storage medium has additional instructions stored which, when executed by the processor, result in the operations further comprising tracking movement of the head, wherein establishing the position of the virtual light source comprises establishing the position according to the movement of the head.

12. The system of claim 11, wherein tracking the movement of the head yields a position information, wherein the computer-readable storage medium has additional instructions stored which, when executed by the processor, result in the operations further comprising creating a three-dimensional model of the head according to the position information.

13. The system of claim 8, wherein the illumination of the head is by a virtual diffused light.

14. The system of claim 8, wherein the illumination of the head illuminates a first portion of the head while not illuminating a second portion of the head.

15. A computer-readable storage device having instructions stored which, when executed by a computing device, cause the computing device to perform operations comprising:
    detecting a head within an image;
    determining an orientation of the head according to locations of at least two features on the head;
    establishing a position of a virtual light source in the image according to the orientation of the head; and modifying the image to have an illumination of the head using the virtual light source, wherein the illumination is further according to a distance of the head from the virtual light source.

16. The computer-readable storage device of claim 15, wherein the computer-readable storage device has additional instructions stored which, when executed by the computing device, result in the operations further comprising communicating the illumination of the head to a video conference system.

17. The computer-readable storage device of claim 15, wherein the at least two features on the head are two of an eye, a lip, an ear, a nose, a cheek, a chin, and an eyebrow.

* * * * *